United States Patent [19]

Longsworth

[11] 4,223,540
[45] Sep. 23, 1980

[54] DEWAR AND REMOVABLE REFRIGERATOR FOR MAINTAINING LIQUEFIED GAS INVENTORY

[75] Inventor: Ralph C. Longsworth, Allentown, Pa.

[73] Assignee: Air Products and Chemicals, Inc., Allentown, Pa.

[21] Appl. No.: 17,009

[22] Filed: Mar. 2, 1979

[51] Int. Cl.³ .............................................. F25B 19/00
[52] U.S. Cl. ..................................... 62/514 R; 62/298
[58] Field of Search .................. 62/45, 55.5, 6, 514 R, 62/77, 298, 54

[56] References Cited

U.S. PATENT DOCUMENTS

| | | | |
|---|---|---|---|
| 2,458,894 | 1/1949 | Collins | 62/178 |
| 3,360,955 | 1/1968 | Witter | 62/335 |
| 3,620,029 | 11/1971 | Longsworth | 62/6 |
| 3,688,514 | 9/1972 | Prost | 62/514 R |
| 3,728,868 | 4/1973 | Longsworth | 62/222 |
| 3,894,403 | 7/1975 | Longsworth | 62/55 |
| 3,921,412 | 11/1975 | Heath et al. | 220/85 VR |
| 4,117,694 | 10/1978 | Belmore | 62/55.5 |

Primary Examiner—Ronald C. Capossela
Attorney, Agent, or Firm—James C. Simmons; E. Eugene Innis

[57] ABSTRACT

A cryostat for maintaining an inventory of a liquefied cryogen including a vacuum jacketed reservoir (Dewar) containing heat shields in the vacuum jacket, the heat shields cooled to different temperatures and a cryogen recondenser cooled by a cryogenic refrigerator. Included in the cryostat is an access passage to place objects in the cryogen and to support the refrigerator, the access passage including means to remove the refrigerator without opening the liquid cryogen to ambient atmosphere.

10 Claims, 3 Drawing Figures

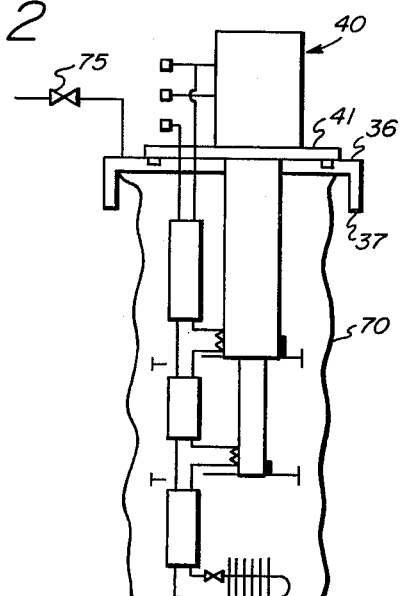
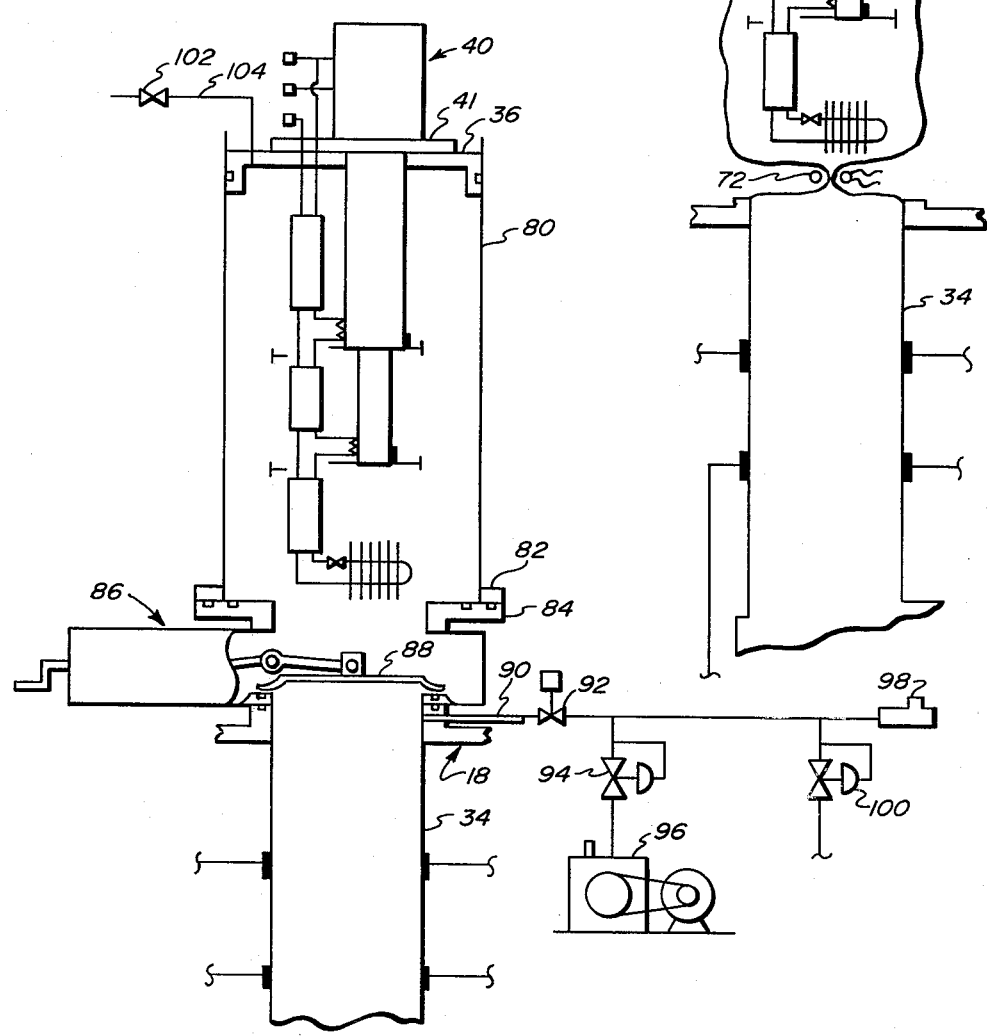
FIG. 2
FIG. 3

DEWAR AND REMOVABLE REFRIGERATOR FOR MAINTAINING LIQUEFIED GAS INVENTORY

BACKGROUND OF THE INVENTION

1. Field of the Invention

This invention relates to cryostats utilized to produce an inventory of a liquefied cryogen (e.g. helium). The liquefied cryogen can be used to continuously refrigerate and thus operate infra-red detectors, superconducting devices, and the like which require extremely low temperature environments. In the case of helium as the cryogen, temperatures on the order of 4.2° Kelvin (K.) (−268.9° C.) are required to maintain a liquid helium inventory.

2. Description of the Prior Art

For small devices cooled to temperatures on the order of that of liquid helium, miniature cryogenic refrigeration systems including a dewar within which is disposed a heat exchanger containing at the cold end thereof a Joule-Thompson valve or orifice have been used. These devices, as shown in U.S. Pat. No. 3,728,868, utilize a source of high pressure gas which is cooled through the heat exchanger and expanded through the Joule-Thompson valve to provide a small inventory of a liquid cryogen (e.g. helium).

Other prior art systems for producing liquefied cryogens in volume (e.g. helium) are disclosed in U.S. Pat. Nos. 2,458,894 and 3,360,955. Both of the foregoing patents employ one or more expansion engines, together with multi-stage heat exchangers and Joule-Thompson expansion valves to produce liquid helium. In the case of the '894 patent, the liquid helium is used in heat exchange with air to liquefy air for subsequent fractional distillation to produce oxygen. The '955 apparatus is used for producing low temperatures to cool various types of electrical apparatus including superconducting computers.

One of the problems encountered with all prior art Cryostats is the maintenance of an inventory of liquid helium which has a normal boiling point of 4.2° K. One method of maintaining an inventory of liquid cryogen (e.g. helium) is to provide a continuous supply of gaseous cryogen which is liquefied to replace that which boils off due to heat infiltrating the Cryostat. The venting gaseous cryogen can be collected and recondensed. In order to do this, the vented gas must be recycled to a refrigeration apparatus which, in turn, produces the liquid helium which is reintroduced into the liquid inventory or reservoir. In the case of a superconducting electronic devices (e.g. super conducing magnets, super conducting quantum interference devices and Josephson junction devices) access is required to the liquid inventory so the device being cooled can be placed in the inventory with electrical leads from the liquid inventory to related equipment operating at ambient conditions. Of necessity, this creates an access passage and possible paths of heat infiltration into the Cryostat to promote boil-off of the liquid cryogen with pressure increases inside the Cryostat. It is desirable to have the cryogenic refrigerator disposed in the access passage or within the vacuum space to cool suitable heat stations in the access means to prevent heat infiltration. In order to do this, the refrigerator is preferably disposed within the Cryostat housing. Having the refrigerator in this position, it then becomes necessary to provide means to remove the refrigerator should it have to be serviced, preferably without exposing the liquid cryogen inventory to ambient conditions so as to minimize heat infiltration and cryogen boil-off and to prevent contamination of the cryogen by the ambient atmosphere.

A cryogenic refrigerator ideally suited for this application is manufactured and sold by Air Products and Chemicals, Inc., Allentown, Pa. as a DISPLEX® Model CS-308 Closed Cycle Helium Refrigeration System. The displacer-expander refrigerator portion of the Model CS-308 is disclosed in the specification of U.S. Pat. No. 3,620,029, which is incorporated herein by reference. A refrigerator of this type has been used successfully to cool such things as sample holders for Mossbauer Spectroscopy by means of non-contact heat exchange as shown in U.S. Pat. No. 3,894,403.

SUMMARY OF THE INVENTION

In order to provide a cryostat suitable for receiving and maintaining a supply of liquid cryogen, it has been discovered that a cryogenic refrigerator can be placed in the access way (neck tube) of the Dewar or reservoir of a Cryostat to provide a source of refrigeration. The cryogenic refrigerator is coupled to heat shields disposed in the vacuum jacket of the Cryostat housing and in the neck tube to intercept heat infiltration by cooling the shields to temperatures intermediate that of ambient and the temperature of the liquid cryogen. The refrigerator further includes a final stage with a device to recondense the liquid Cryogen boil-off inside the dewar. Such an apparatus would permit continuous operation of a superconducting device in a bath of liquid cryogen (e.g. helium).

Therefore, it is the primary object of this invention to provide a Cryostat utilizing a closed-cycle refrigerator with several stages of refrigeration to intercept heat leak into the liquid cryogen and recondense cryogen boil-off.

It is a further object of the invention to provide a Cryostat adapted to removal, repair, and replacement of the refrigerator while the superconducting device continues operation.

It is yet another object of the invention to provide a Cryostat with minimized cryogen boil-off during periods when the refrigerator is off and/or being serviced.

It is still a further object of the invention to provide a Cryostat wherein constant pressure and temperature of the liquid cryogen is maintained during periods when the refrigerator is off and/or being serviced.

BRIEF DESCRIPTION OF THE DRAWING

FIG. 2 is a fragmentary schematic diagram of the apparatus of FIG. 1 illustrating an apparatus for removing the cryogenic refrigerator operating at atmospheric pressure.

FIG. 3 is a fragmentary schematic diagram of the apparatus of FIG. 1 with a cryogenic refrigeration removal system adapted for a cryostat with the cryogen at a pressure above or below atmospheric.

DESCRIPTION OF THE PREFERRED EMBODIMENT

Figure 1:
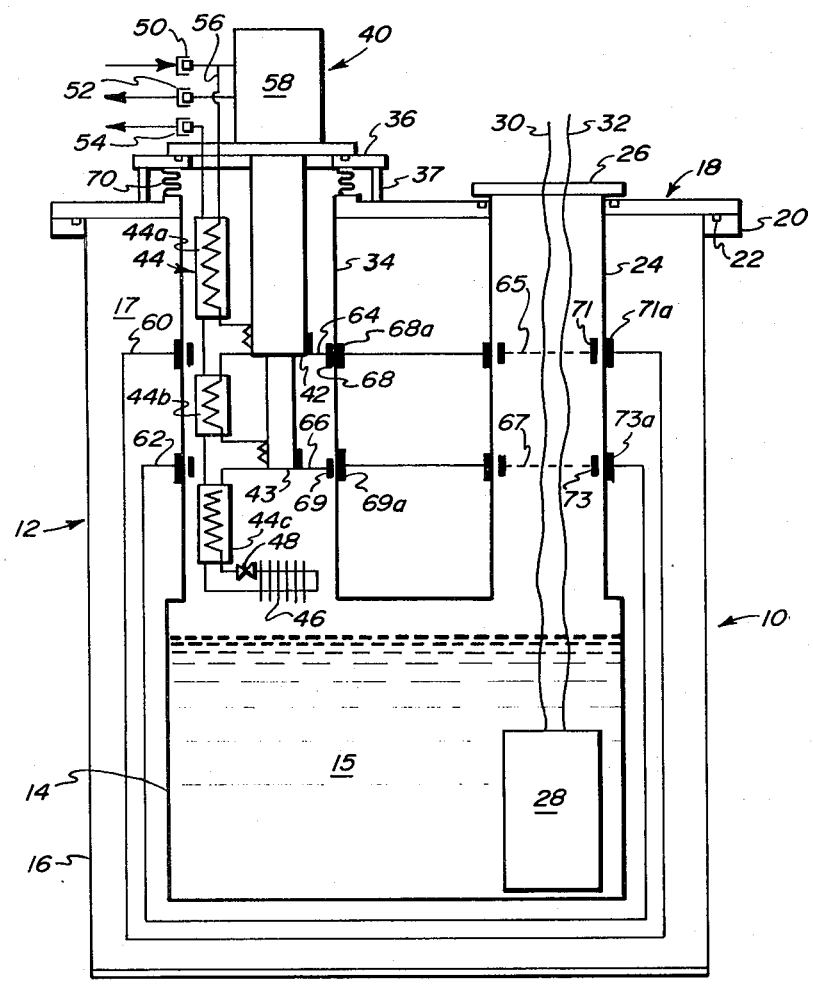
FIG. 1 is a schematic representation of an apparatus according to the present invention.

For the purposes of describing the preferred embodiment, the specification will refer to a liquid helium Cryostat with a removable 4.2° K. (−268.9° C.) refrigerator. The apparatus of the invention is adaptable to any other cryogen that is a gas at normal atmospheric temperature and pressure.

Referring to FIG. 1, the Cryostat 10 includes a vacuum housing 12 having an inner shell 14 defining a reservoir for storing a quantity of cryogenic fluid 15 and an outer shell 16. The space 17 between inner shell 14 and outer shell 16 is evacuated. The housing 12 is closed by a cover or warm flange 18 fitted to the vacuum housing 12 by a suitable complimentary flange 20 and sealing devices 22 (e.g. O-rings) to thus effect a vacuum tight seal.

Between the inner shell 14 defining the reservoir containing the liquid cryogen inventory 15 and the warm flange 18, the Cryostat 10 includes an access passage or neck tube 24 closed by a vacuum tight closure 26 as is well-known in the art. Neck tube 24 provides a means for placing the device being cooled (e.g. superconducting electronic device 28 inside of the liquid cryogen inventory 15). Projecting from superconducting electronic device 28 are a pair of electrical leads 30, 32 for connecting the superconducting electric device 28 to the related electronic equipment (not shown). While it is possible to construct a Cryostat with a single access port or neck tube 24, the preferred structure includes a second access port or neck tube 34 between the warm flange 18 and the inner shell 14 defining the liquid cryogen reservoir. Neck tube 34 is sealed in vacuum tight relationship to the warm flange 18 and includes a suitable closure 36 adapted to receive a cryogenic refrigerator shown generally as 40.

Cryogenic refrigerator 40 is of the type adapted to produce refrigeration at three temperatures; namely, 65° K. (−208.1° C.), 15° K. (−258.1° C.), and 4.2° K. (−268.9° C.). A refrigerator ideally suited for this purpose is manufactured and sold by Air Products and Chemicals, Inc. and designated as a DISPLEX Model CS-308 Closed Cycle Helium Refrigeration System. As pointed out above, this refrigeration system is described in U.S. Pat. No. 3,620,029 and includes a first refrigeration stage 42, a second refrigeration stage 43, a multistage heat exchanger 44 consisting of heat exchanger 44a, 44b and 44c, a liquid cryogen condenser 46 and a Joule-Thompson valve 48. Refrigerator 40 is adapted to utilize helium as a working fluid which is introduced through a coupling means 50. Included in both the refrigerator and heat exchanger are exhaust line couplings 52,54 to collect returning warm helium for recompression and reintroduction to refrigerator 40. As part of the inlet means 50, a branch conduit 56 is provided so that high pressure helium can be introduced simultaneously to the displacer expander section 58 of refrigerator 40 and the heat exchanger portion 44 of refrigerator 40. First stage 42 of the displacer-expander portion 58 of the refrigerator 40 is thermally connected to heat exchanger 44a. Refrigeration produced at the first stage is used in heat exchanger 44a to precool the incoming high pressure fluid in heat exchanger 44a. Similarly, heat exchanger 44b is thermally connected to second stage 43 of displacer expander portion 58 of refrigerator 40 to further precool the incoming high pressure gas to the temperature of second stage 43 of the displacer-expander 58. Finally, high pressure gas exiting heat exchanger 44b is further cooled in heat exchanger 44c and expanded through a Joule-Thompson valve or orifice 48 to provide a temperature of 4.2° K. (−268.9° C.) in condenser 46.

Included within the vacuum space defined by the inner and outer shells 14 and 16 of the vacuum housing 12 are a first radiation shield 60 and a second radiation shield 62. The first radiation shield 60 is thermally connected to the first stage 42 of displacer expander 58 and second radiation shield 62 is thermally connected to the second stage 43 of displacer expander 58. Also included in the neck tubes 24 and 34 are heat stations 64,65 and 66,67 thermally connected to the first and second stages of the displacer-expander 58, respectively. The radiation shields and the heat stations are fabricated from materials having high thermal conductivity such as aluminum or copper, whereas, the neck tubes 24 and 34 are constructed of materials having low thermal conductivity such as stainless steel or fiberglass.

In operation, when an inventory of liquefied helium (15) is introduced into the dewar defined by inner wall 14, some of the liquefied gas begins to boil off and helium gas fills the vertical neck tubes and becomes thermally stratified. Thus, there is created a temperature gradient from approximately 4.2° K. in the liquid helium reservoir to ambient temperature at the warm flange 18. Cover plate 26, and refrigerator removal flange 36 seal the neck tubes so that the helium cannot vent to ambient and air cannot leak in. Pressure within the Cryostat 10 and the temperature of the liquid helium 15 is determined by the temperature of the helium condenser 46. For example, the Model CS-308 refrigerator can maintain pressures in the range of about 7 psia (48 KPa) to about 20 psia (138 KPa), which corresponds to liquid helium temperatures of between 3.5° K. (−269.6° C.) and 4.5° K. (−268.6° C.). Heat stations 68,69 attached to the displacer expander refrigerator 58 at the first stage 42 where approximately 65° K. (−208.1° C.) refrigeration is produced and at the second stage 43 where approximately 15° K. (−258.1° C.) refrigeration is produced comprise horizontal plates that terminate in the band which is in close physical proximity to the respective heat station bands on refrigerator neck tube 34. The gap between the bands 68,68a and 69,69a contains helium gas which is in the neck tube 34 and serves to transport heat from one band to the other without the need of mechanical coupling. A band with a diameter of 150 mm, width of 25 mm and gap of 0.1 mm can conduct 10 watts of heat at 65° K. (−208.1° C.) with a temperature drop of 1.5° K. (1.5° C.). Similar band 71,71a and 73,73a are located within the process neck tube 24 where they intercept heat leak in the stratified helium and lead wires 30,32. Heat is conducted from the process neck tube 24 to the refrigerated neck tube 34 through a thermal strap which may be the radiation shields (60,62). The horizontal heat stations (64,66,65,67) in both neck tubes 39,34 respectively serve to establish the temperature in the helium gas. They also help block thermal radiation in the neck tube. Radiation and convective thermal losses in the neck tubes 24,34 may be further reduced by packing the neck tubes with a foam or glass fiber type insulation (not shown). In order to minimize convective heat losses within the refrigerator neck tube 34, it is essential to match the temperature profile in each heat exchanger (44a, 44b, 44c) with the temperature profile in the displacer expander refrigerator 58 and the neck tube 34. Thus, it is preferable to design the heat exchangers such that heat exchanger 44a is positioned between the room temperature flange and the first heat station 64, the second heat exchanger 44b is positioned between the first and second heat stations 64,66, and the Joule-Thompson heat exchanger 44c is positioned between the second heat exchanger 44b and the liquid helium inventory 15. The warm end of each heat exchanger 44a, 44b, 44c is positioned closest to the warm flange 18 of the cryostat 10.

When the displacer expander refrigerator 58 is turned off, helium will begin to boil off and will rise through one or both of the neck tubes 24,34, depending upon where a vent valve or valves (not shown) are located. One liquid liter of helium absorbs about 0.73 watt hours (WHr) of heat as it vaporizes at atmospheric pressure and about 1 WHr for every 5° K. (5° C.) rise in temperature. The venting helium cools the heat stations and thus minimizes the boil-off rate.

Having the refrigerator 40 mounted in a neck tube 34 results in the refrigerator becoming thermally disconnected when it shuts off in a sense that there is no direct heat path to the liquid helium and the refrigeration in the boil-off helium can be used effectively to intercept heat leak.

Pressure and temperature control of the helium is maintained by an auxiliary system such as shown in FIG. 3, as will hereinafter be more fully described, during periods when the refrigerator is off and when it is being replaced. In the case of operation at atmospheric pressure, a simple relief valve is all that is needed.

Helium boil-off rate during periods when the refrigerator is off and is being serviced would typically be less than 1 liquid liter per hour for a Model CS-308 refrigerator, thus a surplus helium inventory of 30 liters of liquid would suffice to continue operation for 24 hours and cool down a warm replacement refrigerator. After a new unit is operating, it can be used to liquefy make-up gas over a period of one week (typically) to replenish the liquid that is lost.

FIG. 2 shows an apparatus for removing the refrigerator 40 without exposing the liquid cryogen to the atmosphere. In particular, the apparatus of FIG. 2 is ideally suited for units operating at atmospheric pressure. In addition to the refrigerator 40 mounted on flange 36, the underside of flange 36 includes a flexible sleeve 70 which may be of plastic, neoprene rubber, rubberized fabric or the like and may either be tubular or accordion pleated in shape such as shown in FIG. 1. In normal operation the sleeve 70 is folded around the top of the refrigerator flange 36 as shown in FIG. 1. It is preferable to have the sleeve 70 surrounded by a sealed housing filled with helium so that air does not infuse through the material and into the helium space such as shown in FIG. 1 by having a depending flange 37 on the refrigerator flange 36 and suitable sealing means (not shown) as is well-known in the art.

In order to remove the refrigerator from neck tube 34, it is simply withdrawn so that it becomes surrounded by flexible sleeve 70 as shown in FIG. 2. As the refrigerator 40 is removed, helium gas is supplied through a purge-vent valve 75 while the refrigerator 40 is being lifted in order to keep the removal sleeve somewhat inflated and out of contact with cold refrigerator 40. Once the refrigerator 40 is lifted, the flexible removal sleeve 70 can be tied at its base by a suitable closure means 72 to form a gas tight seal. If the seal is not perfect a flow of purge gas can be maintained. The refrigerator 40 can then be lifted out of the sleeve 70, breaking the gas seal between the refrigerator removal flange 36 and the refrigerator flange 41. The refrigerator 40 may be removed from the sleeve while it is still cold and taken away for service to any convenient location. The sleeve 70 is then folded with the sealing means 72 in place so that the refrigerator removal flange 36 is again caused to mate with the warm flange 18 of cryostat 10 to maintain a gas tight closure of the cryostat 10.

To install a warm refrigerator, the procedure is essentially reversed. First, the refrigerator removal flange 36 is removed from warm flange 18 and the sleeve extended. The refrigerator 40 is put into the extended flexible sleeve and a gas seal is made between the refrigerator flange 41 and the refrigerator removal flange 36. The purge valve 75 on the removal sleeve flange 36 is then used to inflate and deflate the flexible sleeve 70 several times to purge out most of the air and replace it with helium. The sealing means 72 is then released and the refrigerator lowered into the neck tube 34. Lowering refrigerator 40 will result in helium venting through the relief valve 75 due to displacement of helium from the sleeve and venting of cold helium that is warmed by the warm refrigerator. Cold helium flowing up past the refrigerator 40 as it is inserted will cool it down with the coldest gas coming into contact first with the part of the refrigerator that will be coldest when it is operating. Most efficient utilization of the cold helium is obtained if the refrigerator is lowered during a period of 10 to 15 minutes at a rate that results in the helium vent rate being nearly constant. After refrigerator 40 is completely inserted, it is turned on.

Referring to FIG. 3, an alternate method of removing the refrigerator from the cryostat 10 includes a rigid removal sleeve 80 mated by suitable flanges 82, 84 in gas tight relationship to a gate valve assembly 86. Also shown in FIG. 3 is an auxiliary pressure control system to maintain liquid helium at a pressure above or below atmospheric while the refrigerator 40 is turned off, being removed, serviced, and reinstalled. The auxiliary pressure control system includes a conduit 90 communicating with neck tube 34 which in turn is connected through a first control valve 92 and subsequently by a suitable conduits to a second control valve 94 and vacuum pump 96. This system also includes a pressure relief valve 98 and flow control valve 100 controlling flow from a helium supply source (not shown).

With the apparatus of FIG. 3, the gate valve 86 with valve element 88 normally in the retracted position are an integral part of the cryostat 10 and affixed to warm flange 18 by suitable sealing means as is well known in the art. Rigid sleeve 80 can be removably attached to flange 84 of the valve assembly 86. Refrigerator removal flange 36 is adapted to be held in sealing engagement with flange 84 of valve assembly 86 and is also adapted to be slidingly, sealingly engaged with rigid sleeve 80. In operation, when the refrigerator is turned off and is to be withdrawn it is removed by withdrawing it upwardly into sleeve 80 as at the same time helium gas is added to rigid sleeve 80 through valve 100 and conduit 90. When the refrigerator 40 is fully withdrawn, the valve element 88 is moved into sealing engagement with neck tube 34 thus acting in the same manner as the seal 72 of the apparatus of FIG. 2. The refrigerator 40 can then be removed from sleeve 80 and serviced as needed. One major difference between the apparatus of FIG. 2 and FIG. 3 is that when the refrigerator is replaced, the sleeve can be evacuated by means of conduit 104 and valve 102 to remove air rather than using a purge technique as disclosed in relation to the apparatus of FIG. 2.

While the refrigeration apparatus disclosed in connection with the foregoing description utilizes a modified Solvay cycle other cryogenic refrigerators operating on different cycles such as the Claude Cycle, Sterling Cycle or Gifford-McMahon Cycle may be employed. There may be only one heat station in the Cryostat or there may be more than two at different temperature levels.

As set out above, the Cryostat may have a working fluid of hydrogen, neon, or any other cryogen that is normally gaseous at atmospheric temperature and pressure.

There may be only one neck tube or there may be more than two with the Cryostat. As set out above, thermal coupling between the refrigerator and the neck tube can be by mechanical means (e.g., conducting straps) or utilize a technique of refrigeration by extended surface such as disclosed in U.S. Pat. No. 3,894,403.

It is also possible that after the refrigerator is withdrawn from the flexible sleeve 70 or the rigid sleeve 80, a foam plug can be inserted and the neck tube purged to further reduce liquid cryogen boil-off while the refrigerator is out being serviced.

Having thus described my invention what is desired to be secured by letters patent of the United States is set forth in the claims.

What is claimed is:

1. A Cryostat comprising in combination:
 a vacuum jacketed reservoir for receiving and holding a supply of liquid cryogen including at least one means for access to said liquid cryogen from outside said reservoir;
 means in said vacuum jacket and said access means to intercept heat infiltrating into said reservoir; and
 refrigeration means to maintain said heat intercepting means at a temperature between that of the liquid cryogen and ambient and recondense liquid cryogen boil-off from said reservoir.

2. A cryostat according to claim 1 wherein said vacuum jacketed reservoir has at least two access means.

3. A cryostat according to claim 2 wherein said refrigeration means is disposed within one access means and an object is immersed in said cryogen through said other access means.

4. A cryostat according to claim 1 wherein said access means includes means for removing said refrigeration means without opening said access means or said reservoir to the ambient atmosphere.

5. A cryostat according to claim 4 wherein said removal means includes a flexible sleeve which surrounds said refrigeration means as it is withdrawn from said access means extending said access means until said refrigeration means is removed from said access means and means to seal said flexible sleeve between said refrigerator and said access means and further means to remove said refrigeration means from said flexible sleeve.

6. A cryostat according to claim 4 wherein said removal means includes a rigid sleeve adapted to mate with said access means and receive said refrigeration means slidably sealed to said sleeve and a gate valve interposed between said sleeve and said access means to seal said sleeve from said cryogen after said refrigeration means is inside said sleeve.

7. A cryostat according to claim 1 wherein said refrigeration means includes a closed cycle refrigerator thermally connected to said heat intercept means at the respective temperatures and a heat exchanger with a Joule-Thompson orifice to provide refrigeration to condense cryogen boil-off.

8. A cryostat comprising in combination:
 a vacuum jacketed reservoir for receiving and holding a supply of liquid cryogen including at least one means for access to said liquid cryogen from outside said reservoir; said access means including a closure device exposed to ambient atmosphere;
 at least one heat station in said access means disposed between said liquid cryogen and said closure device of said access means; and
 refrigeration means disposed in said access means adapted to cool said heat station to a temperature between that of the liquid cryogen and ambient and condense cryogen boil-off from said reservoir.

9. A cryostat accordingly to claim 8 including means to remove said refrigeration means from said access means without opening said reservoir to ambient atmospheric conditions.

10. A cryostat according to claim 8 wherein said refrigeration means includes a two stage closed cycle refrigerator thermally connected to a first and second heat station disposed at the respective stages and a heat exchanger with a Joule-Thompson orifice to provide refrigeration for recondensing cryogen boil-off from said reservoir.

* * * * *